(12) United States Patent  
Cicchiello et al.

(10) Patent No.: US 7,057,787 B2  
(45) Date of Patent: Jun. 6, 2006

(54) ARCHITECTURE FOR LARGE-FOR EO-CRYSTAL-BASED AGILE BEAM STEERING

(75) Inventors: James M. Cicchiello, Cary, IL (US); Curtis J. Harkrider, Wheaton, IL (US)

(73) Assignee: Northrop Grumman Corporation, Loa Angeles, CA (US)

( * ) Notice: Subject to any disclaimer, the term of this patent is extended or adjusted under 35 U.S.C. 154(b) by 84 days.

(21) Appl. No.: 10/976,429

(22) Filed: Oct. 29, 2004

(65) Prior Publication Data

US 2006/0092499 A1    May 4, 2006

(51) Int. Cl.  
*G02F 1/03*    (2006.01)

(52) U.S. Cl. .............. 359/251; 359/252; 359/254; 359/255; 359/256; 359/259; 359/316

(58) Field of Classification Search ............... 359/245, 359/251, 252, 254, 255–258, 259, 315, 316, 359/320, 319  
See application file for complete search history.

(56) References Cited

U.S. PATENT DOCUMENTS 5,122,894 A * 6/1992 Grantham .................. 359/245  
5,126,869 A * 6/1992 Lipchak et al. ............. 349/202  
5,253,033 A * 10/1993 Lipchak et al. ............ 356/4.01  
2003/0161028 A1 * 8/2003 Gosselin et al. ............ 359/290  
2005/0041920 A1 * 2/2005 Gu et al. ...................... 385/31

OTHER PUBLICATIONS

Serati et al. Advanced Liquid Crystal on Silocon Optical Phased Arrays, IEEE, 2002, 8 pages, Lafayette, CO.  
Kulishov et al. Electro-Optically Induced Tilted Phase Gratings . . . , Optical Society of America, 2001, pp. 457-464, vol. 18, No. 4, Canada.  
McManamon et al., Optical Phased Array Technology, Proceedings of the IEEE, 1996, pp. 268-298.  
Thomas et al. Optimal Cascade Operation of Optical Phased-Array Beam Deflectors, Applied Optics, 1998, pp. 6196-6212, vol. 37, No. 26.

* cited by examiner

*Primary Examiner*—Evelyn A. Lester  
(74) *Attorney, Agent, or Firm*—Stetina Brunda Garred & Brucker

(57) ABSTRACT

An electro-optic crystal based beam-steering device preferably based on KTN, having a first deflector and a second deflector. The first deflector has a pair of substrates each having a plurality of first electrode lines extending along a first direction and a plurality of electro-optic crystal modulators interposed between the first electrode lines. The second deflector has a pair of substrates each having a plurality of second electrode lines extending along a second direction and a plurality of electro-optic crystal modulators interposed between the second electrode lines. The first direction is orthogonal to the second direction.

37 Claims, 5 Drawing Sheets

ARCHITECTURE FOR LARGE-FOR EO-CRYSTAL-BASED AGILE BEAM STEERING

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates in general to an agile beam steering device and a method of fabricating the same, and more particular, to an agile beam steering device made of electro-optic (EO) material.

Electrically tunable blazed phase gratings that utilize liquid crystal materials as the electro-optic filter have been proposed recently. Devices of this sort use a layer of liquid crystal sandwiched between parallel transparent substrates. One of the substrates is patterned with closely spaced electrodes, and the opposite substrate may be coated with an uninterrupted common electrode. Application of a linearly changing voltage over a small range of the electrodes induces a linear phase profile in this region. When the linearly changing voltage is periodically applied to the electrodes across the entire liquid-crystal layer, a periodic phase characteristic of a blazing grating is formed.

A common problem of the liquid-crystal beam-steering device is the low efficiency, which is known to be the result of the inability to sharply change orientation at the blaze resets. Sharp phase resets in orientation are prohibited by field fringing. The blaze resets must occur sharply and crisply, or else the "flyback" problem presents in decreased efficiency. Any optical beam propagating through the "flyback" regions cannot be steered as efficiently as required. Therefore, although the liquid crystal beam-steering device is operative to theoretically modulate an optical beam with a steering angle as big as about ±17°, the flyback problem reduces the steering angle to about ±3° practically.

Recently, cascading elements based on electro-optic crystals such as lithium niobate $LiNbO_3$ and lanthanum modified lead zirconate titanate (PLZT) have been developed. These elements provide relatively fine steering angles only. For example, Thomas, et al., have reported a two-stage, phase-array, PLZT-based cascade, which provides steering angles of about ±0.5° with an efficiency of about 50%. For many electro-optic missions, the requirement on field-of-regard (FOR) is coverage of one "cube face", or a steering angle of about ±54.7°. There is thus a substantial need to develop a large-FOR, agile beam-steering device based on a material having a higher electro-optic coefficient than PLZT.

BRIEF SUMMARY OF THE INVENTION

An electro-optic-crystal based, beam-steering device is provided to overcome the drawbacks of the liquid-crystal-based beam-steering device. The beam-steering device comprises a first deflector and a second deflector. The first deflector includes a pair of substrates each having a plurality of first electrode lines extending along a first direction and a plurality of electro-optic crystal modulators interposed between the first electrode lines. The second deflector includes a pair of substrates each having a plurality of second electrode lines extending along a second direction and a plurality of electro-optic crystal modulators interposed between the second electrode lines. The first direction is orthogonal to the second direction.

Preferably, the substrates of the first and second deflectors are transparent to an optical beam to be modulated, and the first and second electrode lines are also transparent to the optical beam. For example, the substrates of the first and second deflectors can be fabricated from glass, while the first and second electrode lines are formed of indium tin oxide. In one embodiment, there are nine electro-optic crystal modulators in each of the first and second deflectors. To avoid walk-off of a deflected modulated optical beam, the substrates and the electro-optic crystal modulators of the first and second deflectors are successively larger, while the number of electrodes formed on the substrates of the first and second deflectors is successively larger as well.

Each of the electro-optic crystal modulators of the first and second deflectors includes a plurality of electro-optic crystal layers, a plurality of electrode layers, and a pair of substrates, wherein the electro-optic crystal layers and the electrode layers are alternatively interposed between the substrates. The electro-optic crystal layers are preferably fabricated from potassium tantalate niobate. In one embodiment, there are two electro-optic crystal layers and three electrode layers in each electro-optic crystal modulator. Each of the electrode layers includes a plurality of electrodes spaced from each other by a gap, which is filled with an insulation material. To enhance the diffraction efficiency, the electro-optic crystal layers and the electrode thicknesses have an aspect ratio of about 1:1. The beam-steering device further comprises a plurality of third and fourth electrode lines formed on exterior side surfaces of the pair of substrates for the first and second deflectors, respectively. The third electrode lines extend along the first direction and the fourth electrode lines extend along the second direction. The first and third electrode lines are electrically interconnected with the electrode layers of the first deflectors, and the second and fourth electrode lines are electrically interconnected with the electrode layers of the second deflector.

In one embodiment, the first deflector includes 10,000 first electrode lines formed on a smaller substrate thereof and 15,000 first electrode lines formed on a larger substrate thereof. The second deflector includes 50,000 second electrode lines formed on a larger substrate thereof.

In another embodiment, each of the electro-optic crystal modulators of the first and second deflectors includes two mirrored modules. Each module includes a plurality of electro-optic crystal layers, a plurality of electrode layers, and a first substrate and a second substrate, wherein the electro-optic crystal layers and the electrode layers are alternatively interposed between the substrates, and the modules are connected to each other by attaching the second substrates together with the second substrates polished thinner than the first substrates. Similarly, the electro-optic crystal layers are preferably fabricated from electro-optic crystals such as potassium tantalate niobate. Each of the modules includes at least two electro-optic crystal layers and three electrode layers. Each of the electrode layers includes a plurality of electrodes spaced from each other by a gap filled with an insulation material. To enhance the diffraction efficiency, the electro-optic crystal layers and the electrode layers thicknesses have an aspect ratio of about 1:1. The device further comprises a plurality of third and fourth electrode lines formed on exterior side surfaces of the pair of substrates for the first and second deflectors, respectively. The third electrode lines extend along the first direction and the fourth electrode lines extend along the second direction. The first and third electrode lines are electrically interconnected with the electrode layers of the first deflectors, and the second and fourth electrode lines are electrically interconnected with the electrode layers of the second deflector. The first direction is perpendicular to the second direction.

The beam-steering device further comprises a half-wave plate between the first and second deflectors to polarize the optical beam traveling through the first deflector prior to incident on the second deflector.

A method of forming a large field-of-regard beam-steering device is also provided. A first pair of substrates and a second pair of substrates are provided. A plurality of first electrode lines and a plurality of second electrode lines are formed on the first and second pair of substrates, respectively. Preferably, the first electrode lines and the second electrode lines extend along different direction. A first stack of electro-optic crystal modulators is formed. Each of the electro-optic crystal modulator has a plurality of electro-optic crystal layers and electrode layers alternately interposed between a pair of substrates. The first stack of electro-optic crystal modulators is inserted between the first pair of substrates to form a first deflector. A second stack of electro-optic crystal modulators each having a plurality of electro-optic crystal layers and electrode layers alternately interposed between a pair of substrates is formed. The second stack of electro-optic crystal modulators is interposed between the second pair of substrates to form a second deflector. The first deflector and the second deflector are arranged along an axis. The method further comprises a step of providing a wave plate between the first and second deflectors.

A structure of a large-field-of-regard, electro-optic-crystal-based, agile beam steering system is further provided. The system comprises a plurality of first electro-optic crystal layers operative to be biased by an electric field along a first direction and a plurality of second electro-optic crystal layers operative to be biased by an electric field along a second direction. Each of the electro-optic crystal layers has an aspect ratio of modulator thickness to electrode thickness of about 1:1. The first and second electro-optic crystal layers are fabricated by potassium tantalate niobate. The first direction and the second direction are perpendicular to each other. The structure further comprises a wave plate between the first and second deflectors.

BRIEF DESCRIPTION OF THE DRAWINGS

These as well as other features of the present invention will become more apparent upon reference to the drawings wherein.

DETAILED DESCRIPTION OF THE INVENTION

Figure 1:
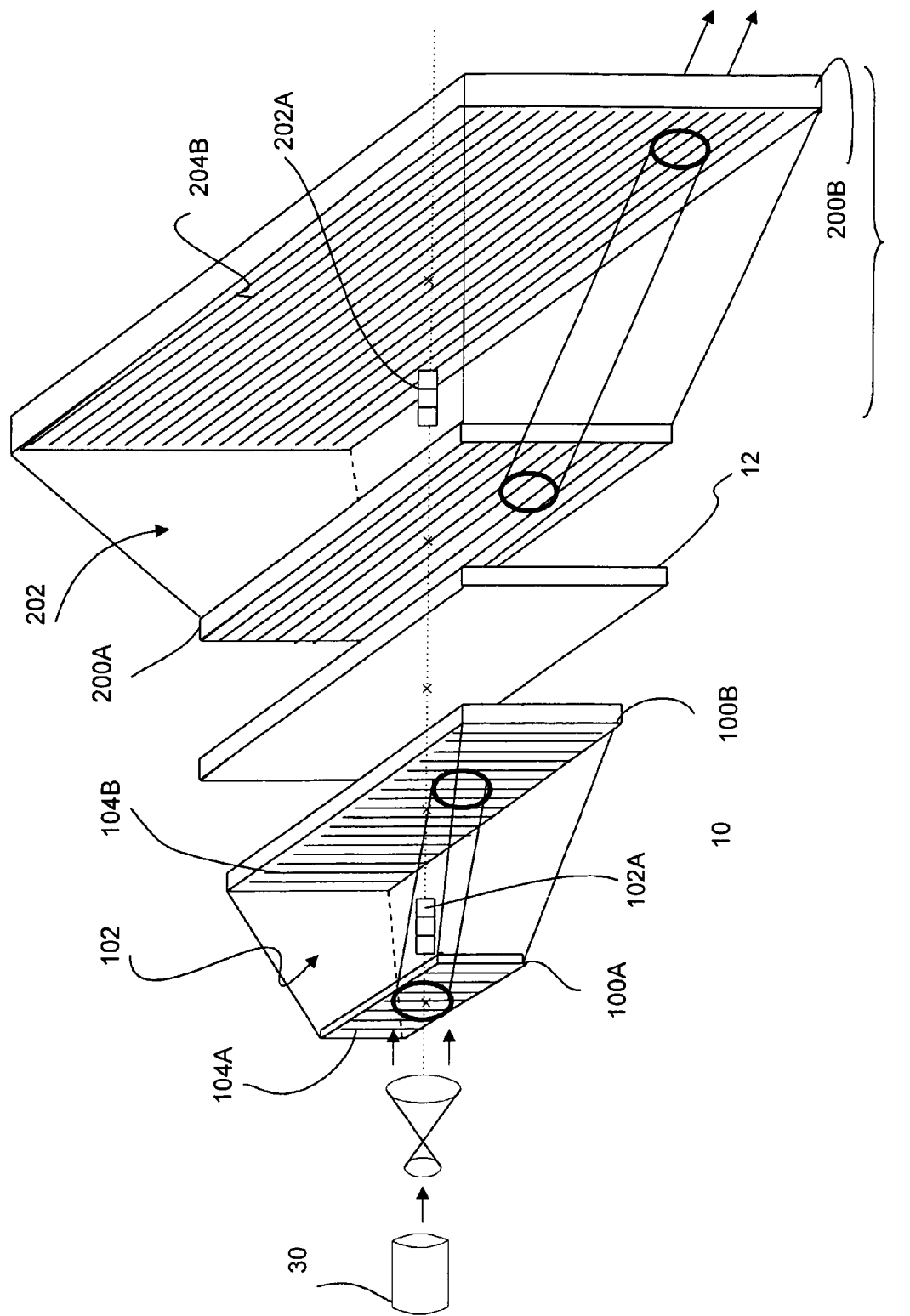
FIG. 1 shows a schematic perspective view of a large field-of-regard, agile beam-steering device provided in one embodiment of the present invention.

As shown in FIG. 1, a large field-of-regard, electro-optic crystal based, agile beam-steering device includes a first deflector 10 and a second deflector 20. The first deflector includes a stack of nine electro-optic crystal modulators elements 102, starting with 100A, ending with 100B and represented in between by 102A. The second deflector 20 includes a stack of nine electro-optic crystal modulators elements 202, starting with 200A, ending with 200B, and represented in between by 202A. The beam-steering device further comprises a half-wave plate 12 between the first deflector 10 and the second deflector 20 for rotating the polarization of the optical beam traveling through the first deflector 10.

In the embodiment as shown in FIG. 1, a plurality of vertical electrode lines 104A and 104B are formed on the substrates 100A and 100B, respectively, and a plurality of horizontal electrode lines 204A and 204B are formed on the substrates 200A and 200B, respectively. The electrode lines 104A and 104B are connected to a power source to apply electrical field across the stack of electro-optic crystal modulators 102 along the vertical direction. In contrast, the electrode lines 204A and 204B are connected to a power source to apply electric field across the stack of electro-optic crystal modulators 202 along the horizontal direction. The electric field along the vertical direction generates a gradient of refraction index of the electro-optic crystal modulators 102 along the horizontal direction. Therefore, when an optical beam travels through the stack of electro-optic crystal modulators 102, the optical beam is deflected off the original optical path horizontally by a deflection angle. Similarly, the electric field along the horizontal direction generates a gradient of refraction index of the electro-optic crystal modulators 202 along the vertical direction. When the optical beam travels through the second deflector 20, the gradient of refraction index of the stack of electro-optic crystal modulators 202 deflects the optical beam off its original optical path vertically by a deflection angle. In this embodiment, as the first deflector 10 is operative to steer the optical beam horizontally, the first deflector 10 is also referred as an X-deflector. Similarly, as the second deflector 20 is operative to steer the optical beam along the vertical direction, the second deflector 20 is also referred as a Y-deflector. It will be appreciated that the first and second sets of electrode lines 104A, 104B, and 204A, 204B may also be oriented to extend along directions other than X-direction and Y-direction, respectively. For example, the first set of electrode lines 104A and 104B may be oriented along Y-direction, while the second set of electrode lines 204A and 204B may extend along X-direction.

To allow the optical beam propagating through the first and second stacks of electro-optic crystal modulators 102 and 202 and deflected thereby, the substrates 100A, 100B, 200A, and 200B, and the electrode lines 104A, 104B, 204A and 204B are preferably fabricated from transparent material. For example the substrates 100A, 100B, 200A and 200B may be fabricated from glass, while the electrode lines 104A, 104B, 204A and 204B can be fabricated from transparent conduction such as indium tin oxide (ITO). Particularly, the substrates 100A to 200B and the electrode lines 104A to 204B are transparent to the optical beam to be steered by the beam-steering device. As the optical beam will be deflected off from its original optical path, preferably, the substrates 100A, 100B, 200A and 200B are successively bigger to prevent walk-off of the steered optical beam.

Consequently, the numbers of the electrode lines 104A, 104B, 204A and 204A are gradually increased as well. For example, the surface area of the substrate 100A, 100B are about 1×1 cm² and 1×3 cm², and there are 10,000 electrode lines 104A formed on the substrate 100A and 15,000 electrode lines 104B formed on the substrate 100B. The substrate 200B includes 50,000 electrode lines 204B with a surface area of about 3×5 cm².

Figure 2:
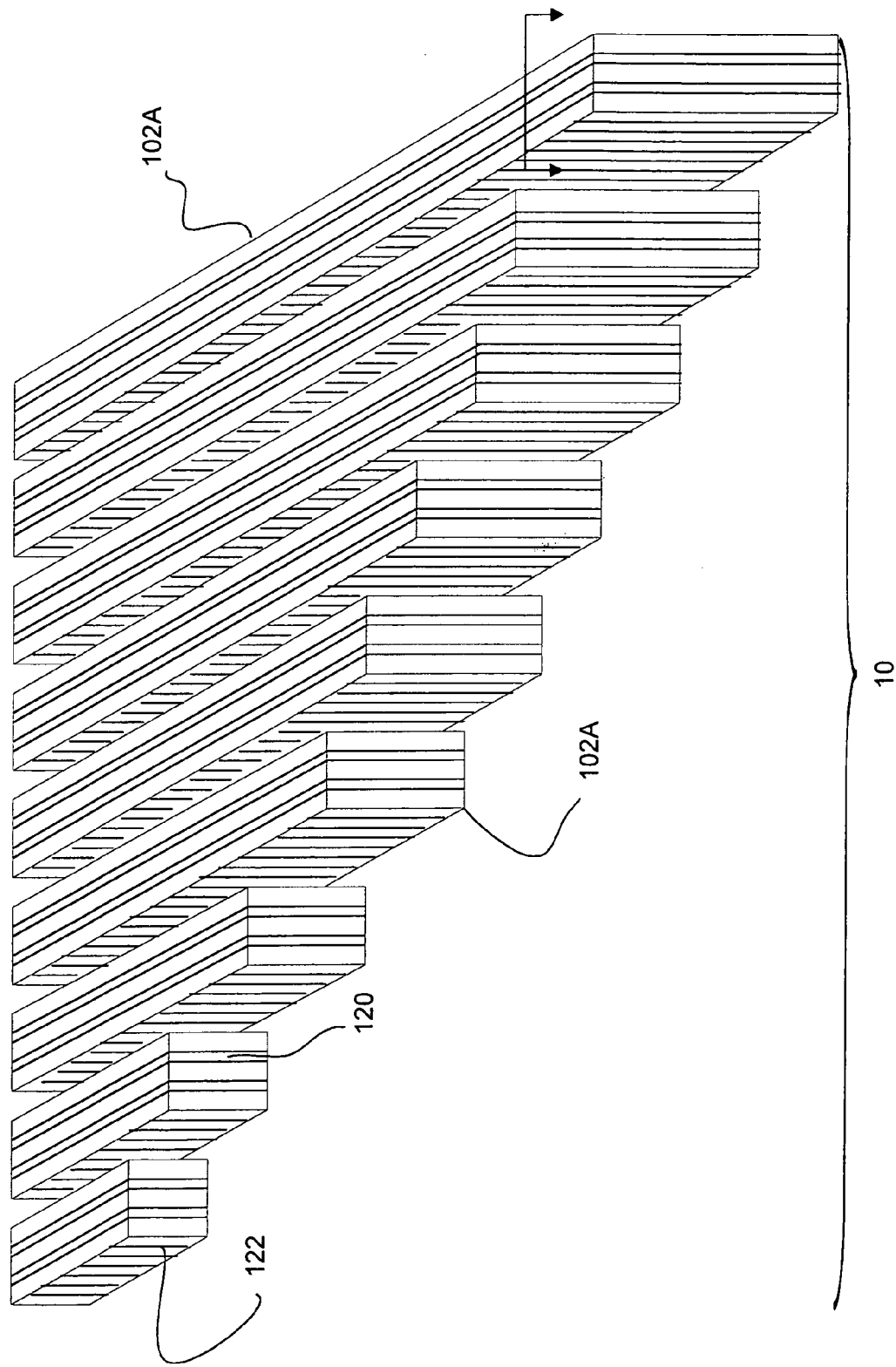
FIG. 2 shows an exploded view of the X-deflector of the beam-steering device as shown in FIG. 1.
Figure 3:
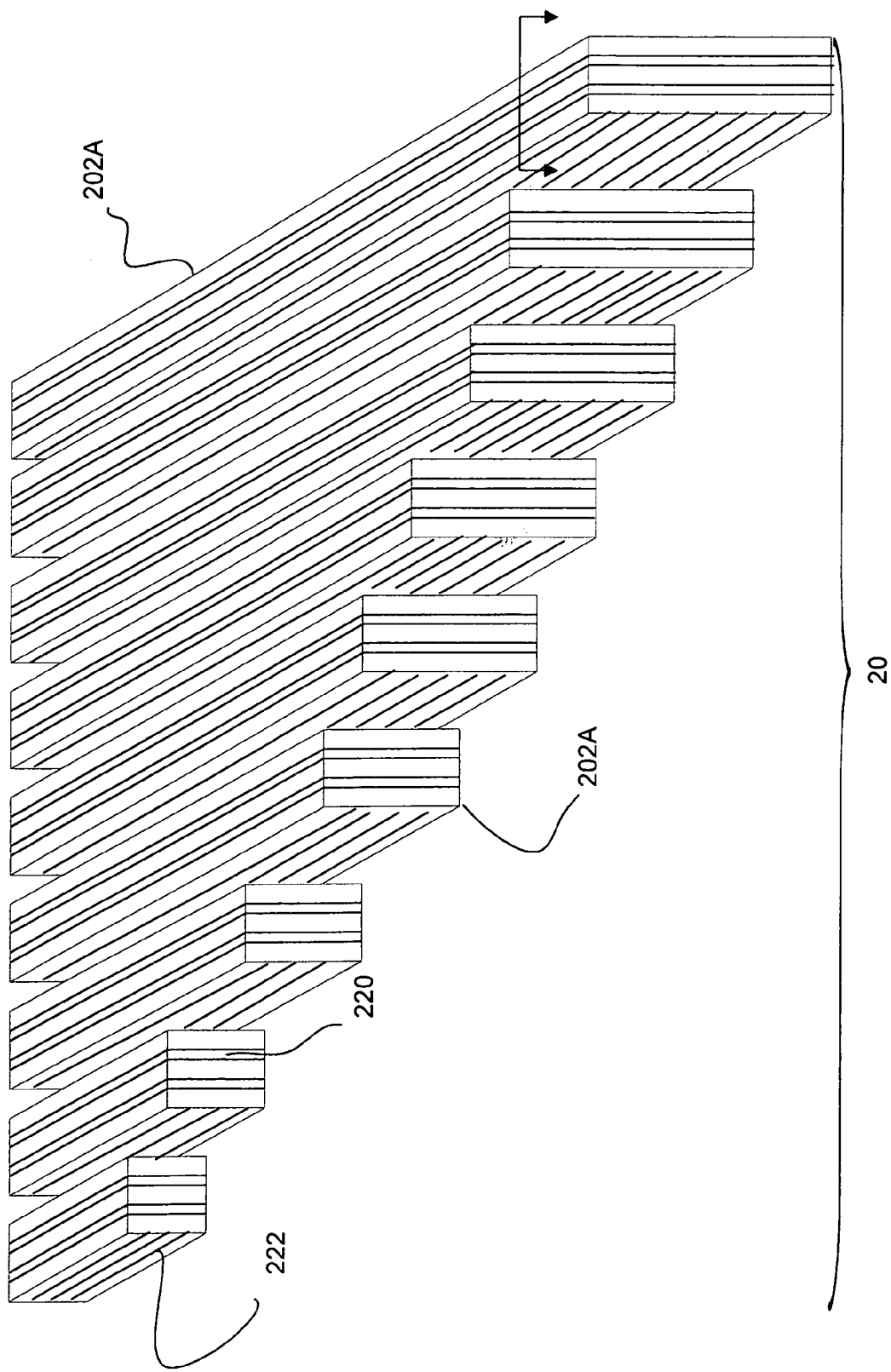
FIG. 3 shows an exploded view of Y-deflector of the beam-steering device as shown in FIG. 1.

FIG. 2 shows an exploded view of the stack of electro-optic crystal modulators 102 of the first deflector 10, and FIG. 3 shows an exploded view of the stack of electro-optic crystal modulators 202 of the second deflector 20. In this embodiment, the X-deflector 10 includes nine successively larger electro-optic crystal modulators 102A, and each of the electro-optic crystal modulators 102A includes a plurality of electro-optic crystal layers 120. Preferably, the electro-optic crystal layers 120 are fabricated from potassium tantalate niobate (KTN). As the first deflector 10 is designed to deflect the optical beam along the X-direction, a plurality of electrode lines 122 is formed on the side surfaces of each electro-optic crystal modulator 102A. Similar to the first deflector 10, the second deflector 20 also includes nine successively larger electro-optical crystal modulators 202A, and each of the electro-optic crystal modulators 202A includes a plurality of electro-optical crystal layers 220. However, instead of the vertical electrode lines 122, the electrode lines 222 formed on the side surface of each electro-optic crystal modulator 202A extend horizontally as shown in FIG. 3.

Figure 4:
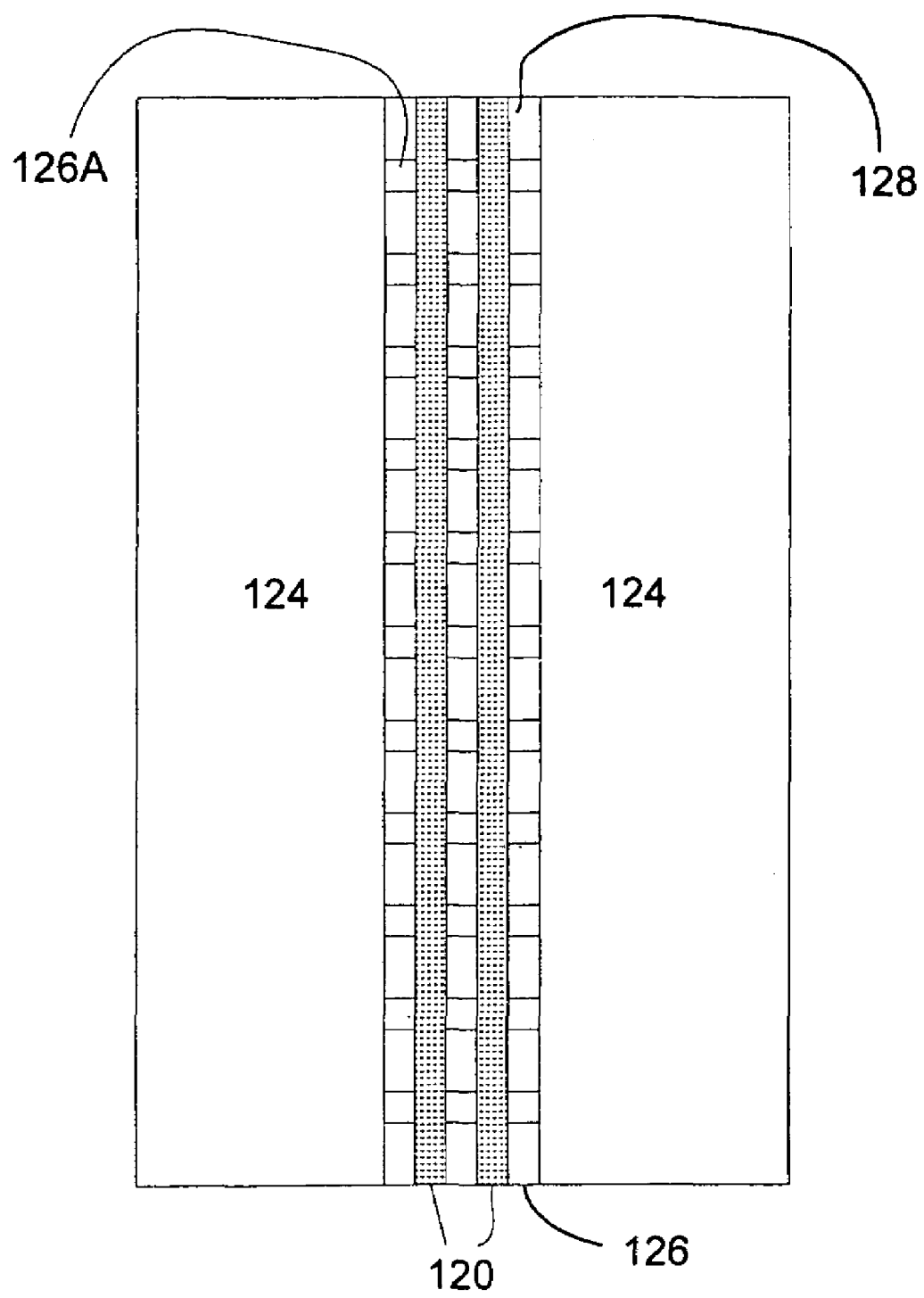
FIG. 4 shows a cross sectional view of one electro-optic modulator of the deflector as shown in FIG. 2.

Referring to FIG. 4, the exemplary structure of the electro-optical crystal modulator 102A is illustrated. As shown, the electro-optical crystal modulator 102A includes two electro-optical crystal layers 120 and three electrode layers 126 alternately disposed between the substrates 124. Each of the electrode layers 126 includes a plurality of electrodes 126A separated from each other by an insulation material 128. To enhance the diffraction efficiency, the thicknesses of electro-optic crystal layers 120 and the electrodes 126 have an aspect ratio of about 1:1. That is, when the thickness of each electro-optical crystal layer 120 is about 1 micron, the width of each electrode 126A is about 1.0 micron, and the distance between the neighboring electrodes 126A is about 0.5 micron. Thereby, a larger steering angle can be obtained due to the enhanced diffraction efficiency. In addition, the numbers of the electro-optic crystal layers 120 and the electrode layers 126 are not limited to two and three, respectively. As the deflection angles generated by the electro-optic crystal layers 120 are additive, a larger steering angle is expected for more electro-optic crystal layers 120.

Figure 5:
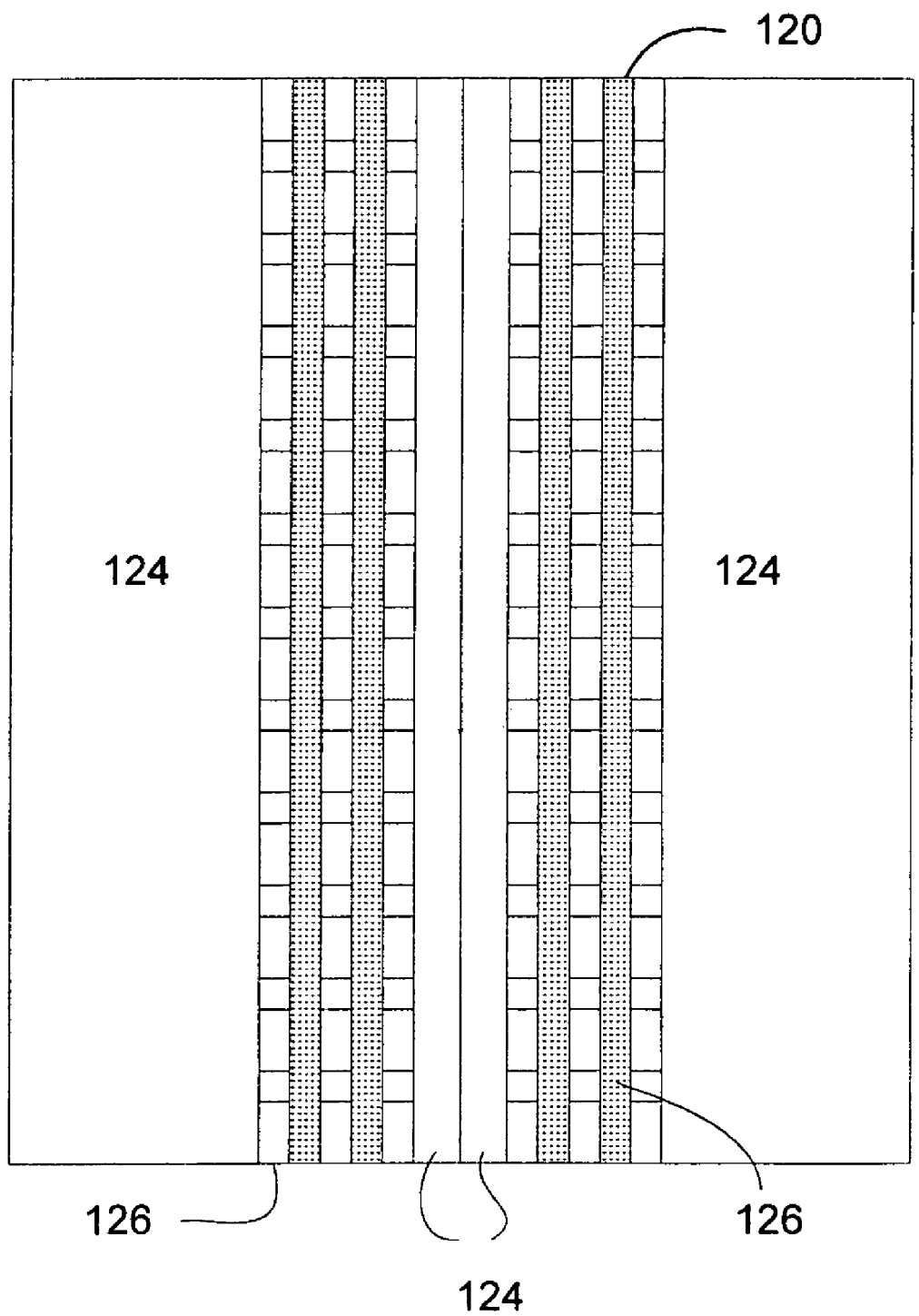
FIG. 5 shows a cross sectional view of another exemplary electro-optic modulator of the deflector as shown in FIG. 2.

FIG. 5 shows another embodiment of the electro-optic crystal modulator 102A. As shown, the electro-optic crystal modulator 102A includes two modules, and each module has two electro-optic crystal layers 120 and three electrode layers 126 alternately disposed between a pair of substrates 124. Similar to FIG. 4, each electrode layer 126 includes a plurality of electrodes 126 separated from each other by an insulation material. The pitch of the electrodes 126A is about the same as the thickness of the adjacent electro-optic crystal layer 120, such that a 1:1 aspect ratio can be obtained to enhance the diffraction efficiency, so as to obtain a larger steering angle. In this embodiment, one of the substrates 124 for each module is polished with a thinner dimension, and the thinned substrates 124 are attached to each other with the corresponding electrodes 126A well aligned with each other. Preferably, an anti-reflection coating is applied at the interface between these two modules.

One the exterior side surfaces of each electro-optic crystal modulator 102A, that is, on the exterior surfaces of the exterior substrates 124, a plurality of electrode lines 122 is formed. The electrode lines 122 interconnect the electrode lines 104A and 104B with the electrodes 126A, such that the electric field can be applied across each electro-optic crystal layer 120.

The electro-optic crystal modulators 202A have the similar structure of the electro-optic crystal modulators 102A apart from that the electrode lines 222 extend horizontally apart from vertically.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An electro-optic crystal based beam-steering device, comprising:
    (a) a first deflector, comprising:
        (i) a pair of substrates, each having a plurality of first electrode lines extending along a first direction;
        (ii) a plurality of electro-optic crystal modulators interposed between the first electrode lines; and
    (b) a second deflector, comprising:
        (i) a pair of substrates, each having a plurality of second electrode lines extending along a second direction; and
        (ii) a plurality of electro-optic crystal modulators interposed between the second electrode lines; wherein the first direction is different from the second direction.

2. The device of claim 1, wherein the substrates of the first and second deflectors are transparent to an optical beam to be modulated.

3. The device of claim 1, wherein the first and second electrode lines are transparent to an optical beam to be modulated.

4. The device of claim 1, wherein the first and second deflectors each includes nine electro-optic crystal modulators.

5. The device of claim 1, wherein the electro-optic crystal modulators of the first and second deflectors are successively larger.

6. The device of claim 1, wherein the substrates of the first and second deflectors are successively larger.

7. The device of claim 1, wherein the numbers of the first and second electrode lines of the first and second deflectors are successively larger.

8. The device of claim 1, wherein each of the electro-optic crystal modulators of the first and second deflectors includes:
    (a) a plurality of electro-optic crystal layers;
    (b) a plurality of electrode layers; and
    (c) a pair of substrates, wherein the electro-optic crystal layers and the electrode layers are alternatively interposed between the substrates.

9. The device of claim 8, wherein the electro-optic crystal layers are fabricated from potassium tantalate niobate.

10. The device of claim 8, wherein each of the electro-optic crystal modulators includes two electro-optic crystal layers and three electrode layers.

11. The device of claim 8, wherein each of the electrode layers includes a plurality of electrodes spaced from each other by a gap.

12. The device of claim 11, wherein the gap is filled with an insulation material.

13. The device of claim 8, wherein the electro-optic crystal layers and the electrode layers adjacent thereto have an aspect ratio of about 1:1.

14. The device of claim 8, further comprising a plurality of third and fourth electrode lines formed on exterior side surfaces of the pair of substrates for the first and second deflectors, respectively.

15. The device of claim 14, wherein the third electrode lines extend along the first direction and the fourth electrode lines extend along the second direction.

16. The device of claim 14, wherein the first and third electrode lines are electrically interconnected with the electrode layers of the first deflectors, and the second and fourth electrode lines are electrically interconnected with the electrode layers of the second deflector.

17. The device of claim 1, wherein the first deflector includes 10,000 first electrode lines formed on a smaller substrate thereof and 15,000 first electrode lines formed on a larger substrate thereof.

18. The device of claim 1, wherein the second deflector includes 50,000 second electrode lines formed on a larger substrate thereof.

19. The device of claim 1, wherein each of the electro-optic crystal modulators of the first and second deflectors includes:
   (a) two mirrored modules, each including:
      (i) a plurality of electro-optic crystal layers;
      (ii) a plurality of electrode layers; and
      (iii) a first substrate and a second substrate, wherein the electro-optic crystal layers and the electrode layers are alternatively interposed between the substrates;
   (b) wherein the modules are connected to each other by attaching the second substrates together.

20. The device of claim 19, wherein the electro-optic crystal layers are fabricated from potassium tantalate niobate.

21. The device of claim 19, wherein the second substrates are thinner than the first substrates.

22. The device of claim 19, wherein each of the modules includes two electro-optic crystal layers and three electrode layers.

23. The device of claim 19, wherein each of the electrode layers includes a plurality of electrodes spaced from each other by a gap.

24. The device of claim 23, wherein the gap is filled with an insulation material.

25. The device of claim 19, wherein the electro-optic crystal layers and the electrode layers adjacent thereto have an aspect ratio of about 1:1.

26. The device of claim 19, further comprising a plurality of third and fourth electrode lines formed on exterior side surfaces of the pair of substrates for the first and second deflectors, respectively.

27. The device of claim 26, wherein the third electrode lines extend along the first direction and the fourth electrode lines extend along the second direction.

28. The device of claim 26, wherein the first and third electrode lines are electrically interconnected with the electrode layers of the first deflectors, and the second and fourth electrode lines are electrically interconnected with the electrode layers of the second deflector.

29. The device of claim 1, wherein the first direction is perpendicular to the second direction.

30. The device of claim 1, further comprising a wave plate disposed between the first and second deflectors.

31. The device of claim 30, wherein the wave plate includes a half-wave plate.

32. A method of forming a large field-of-regard beam-steering device, comprising:
   (a) providing a first pair of substrates and a second pair of substrates;
   (b) forming a plurality of first electrode lines and a plurality of second electrode lines on the first and second pair of substrates, respectively, wherein the first electrode lines and the second electrode lines extend along different direction;
   (c) forming a first stack of electro-optic crystal modulators, each having a plurality of electro-optic crystal layers and electrode layers alternately interposed between a pair of substrates;
   (d) interposing the first stack of electro-optic crystal modulators between the first pair of substrates to form a first deflector;
   (e) forming a second stack of electro-optic crystal modulators, each having a plurality of electro-optic crystal layers and electrode layers alternately interposed between a pair of substrates;
   (f) interposing the second stack of electro-optic crystal modulators between the second pair of substrates to form a second deflector; and
   (g) arrange the first deflector and the second deflector along an axis.

33. The method of claim 32, further comprising providing a wave plate between the first and second deflectors.

34. A structure of a large-field-of-regard, electro-optic-crystal-based, agile beam steering system, comprising a plurality of first electro-optic crystal layers operative to be biased by an electric field along a first direction and a plurality of second electro-optic crystal layers operative to be biased by an electric field along a second direction, wherein each of the electro-optic crystal layers has an aspect ratio of about 1:1 to an electrode layer adjacent thereto.

35. The structure of claim 34, wherein the first and second electro-optic crystal layers are fabricated with potassium tantalate niobate.

36. The structure of claim 34, wherein the first direction and the second direction are perpendicular to each other.

37. The structure of claim 34, further comprising a wave plate between the first and second electro-optic crystal layers.

* * * * *